(12) United States Patent
Dowling

(10) Patent No.: US 8,118,526 B2
(45) Date of Patent: Feb. 21, 2012

(54) ADHESIVE TOILET SEAT WASHER AND METHOD FOR INSTALLING SAME

(76) Inventor: David A. Dowling, Northville, MI (US)

( * ) Notice: Subject to any disclaimer, the term of this patent is extended or adjusted under 35 U.S.C. 154(b) by 661 days.

(21) Appl. No.: 11/844,225

(22) Filed: Aug. 23, 2007

(65) Prior Publication Data

US 2008/0050203 A1 Feb. 28, 2008

Related U.S. Application Data

(60) Provisional application No. 60/839,563, filed on Aug. 23, 2006.

(51) Int. Cl.
*F16B 1/00* (2006.01)
(52) U.S. Cl. .......................... 411/82; 411/82.2; 411/533
(58) Field of Classification Search .................... 411/81, 411/81.2, 258, 82, 82.2, 533
See application file for complete search history.

(56) References Cited

U.S. PATENT DOCUMENTS

| | | | | |
|---|---|---|---|---|
| 3,179,143 A | * | 4/1965 | Schultz et al. | 411/82.2 |
| 3,298,271 A | * | 1/1967 | Krueger | 411/432 |
| 3,747,657 A | * | 7/1973 | Ryder | 411/82 |
| 5,051,049 A | * | 9/1991 | Wills | 411/258 |
| 5,452,944 A | * | 9/1995 | Bear | 301/35.624 |
| 5,839,868 A | * | 11/1998 | Kloian | 411/533 |

* cited by examiner

*Primary Examiner* — Flemming Saether
(74) *Attorney, Agent, or Firm* — Cargill & Associates, P.L.L.C.; Lynn E. Cargill

(57) ABSTRACT

An adhesive washer for a toilet seat fastener assembly which can be easily installed in the toilet seat fastener assembly without having to cope with the problem of slipping bolts and nuts as they will be securely adhered together. An adhesive toilet seat washer in accordance with the present invention comprises a washer material having an adhesive on at least one side of the washer for adhering to the fastener and holding it in place. In practice, a toilet seat is positioned such that the hole on the toilet seat hinge is directly above the hole on the outer wings of the commode bowl basin and a fastener is inserted through both of the holes in the toilet seat hinge and the commode bowl basin. The washer then is secured against the bottom of the commode bowl basin hole and the fastener, and the adhesive on at least one of the surfaces of the washer acts to hold the fastener in position, thereby maintaining the tightness and security of the fastener assembly.

3 Claims, 3 Drawing Sheets

ADHESIVE TOILET SEAT WASHER AND METHOD FOR INSTALLING SAME

TECHNICAL FIELD

The present invention relates generally to toilet seat securement devices and, more particularly to an adhesive washer used to secure the threaded fastener assembly used in typical toilets.

BACKGROUND OF THE INVENTION

Conventional toilet seats are oftentimes not sufficiently engaged to toilet bowl basins because the hole in the toilet basin to receive the threaded fastener assembly for the seat is usually much larger than the diameter of the threaded fastener assembly. A normal commode has a winged section in the rear of the bowl with holes therethrough to receive a bolt for holding the seat to the porcelain toilet. The seat is attached to the bowl by either a metal bolt with a nut, or more commonly recently a threaded nylon bolt and nut assembly which can be tightened to bring the toilet seat into secure engagement with the toilet bowl of the commode. The hole in the commode is generally much larger than the bolt size, so there is a looseness associated with that, after numerous times of being sat upon. Since users sit down at varying angles, the bolt becomes loose and this looseness translates into a toilet seat that feels unsecure and "sloppy".

In order to address this issue, it is one aspect of the present invention to provide an adhesive washer which will keep the bolt and nut in secured position so that the toilet seat remains secure against the outer wings of the toilet bowl basin and the hole that is formed therein. The compressive strength of the nut and bolt act to secure the seat to the toilet bowl for a secure mounting method to prevent "play" of the toilet seat on top of the commode itself.

When the seat is mounted directly onto the commode outer wings, a fastening assembly is generally inserted through a hole that has been formed in the outer wings of the commode basin. This hole is generally included on every commode basin. The toilet seat itself includes a hole to receive a fastener assembly therethrough as the fastener is inserted through the hole of the toilet seat and the hole in the commode basin, onto which a nut is threaded from below onto the body of the fastener assembly and is then securely tightened. However, the fastening member must be held in position while the bolt is threaded through both the seat and the commode and maintained a tightness of the nut against the fastener itself. On the other hand, in use, when a person sits down on the toilet, they shift and "vibrate" the seat against the commode bowl. This tends to loosen the nut against the bolt fastener, and before long the toilet seat is loose against the commode.

Traditionally, in order to solve this problem, one would put their hand underneath the outer wing of the commode bowl basin and tighten the nut by utilizing a tool to hold the fastener, or bolt, in position until the fastener is securely tightened against the commode bowl basin, once again.

This is an unpleasant task, and may be difficult to achieve when the toilet is mounted in an inconvenient location such that the user cannot easily retighten the nut. In a normal commode situation, the fastener assembly must be held in position by hand, support jig, or screwdriver until the bolt is threaded into the nut and tightened. As a consequence of having to cope with the problem of the unloosened bolts and nuts, the conventional process of tightening the nut bolt in a restricted space has become difficult and time consuming.

SUMMARY OF THE INVENTION

Accordingly, it is an aspect of the present invention to provide an adhesive washer for the toilet seat fastener assembly which can be easily installed in the toilet seat fastener assembly without having to cope with the problem of slipping bolts and nuts as they will be securely adhered together. An adhesive toilet seat washer in accordance with the present invention comprises a compressible washer material having a pressure sensitive adhesive on at least one side of the washer for adhering to the nut and holding it in place. In practice, a toilet seat is positioned such that the hole on the toilet seat hinge is directly above the hole on the outer wings of the commode bowl basin and a bolt or other fastener is inserted through both of the holes in the toilet seat hinge and the commode bowl basin. Then the bolt is inserted through the adhesive toilet seat washer and the threaded nut is threaded onto the bottom of the bolt which is extending through the washer and tightening the nut against the washer. The washer then is secured against the bottom of the commode bowl basin hole and the nut, and the adhesive on at least one of the surfaces of the washer acts to hold the nut in position, thereby maintaining the tightness and security of the fastener assembly, in accordance with the present invention.

BRIEF DESCRIPTION OF THE DRAWINGS

For a further understanding of the nature and advantages of the expected scope and various embodiments of the present invention, reference shall be made to the following detailed description, and shall be taken in conjunction with the accompanying drawings, in which like parts are given the same reference numerals, and wherein.

DETAILED DESCRIPTION OF THE INVENTION

Figure 1:
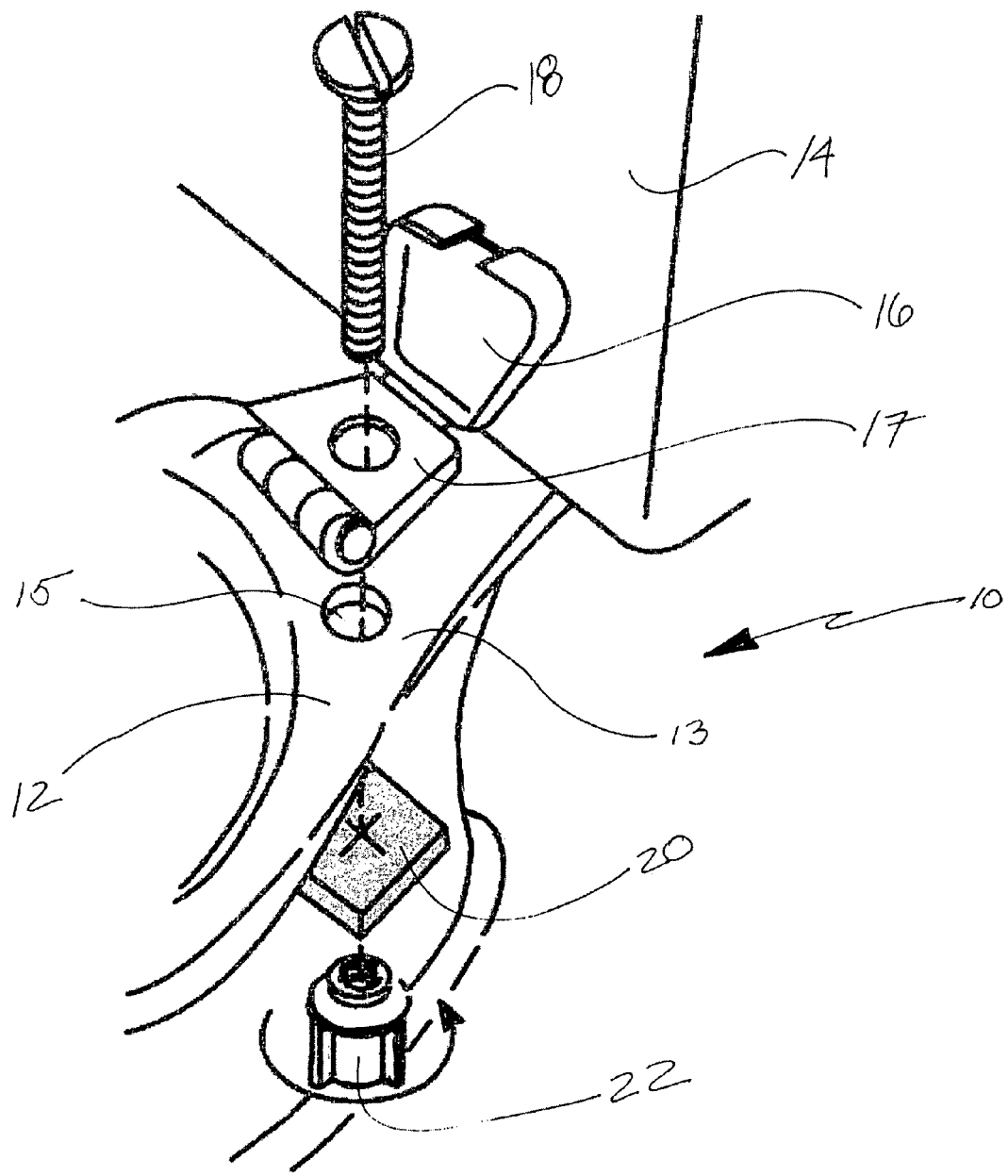
FIG. 1 depicts the present invention installed in configuration with a commode bowl basin outer wing and toilet seat configuration in an orthographic perspective view showing the individual components thereof.

Although specific terms are used in the following description for the sake of brevity and clarity, these terms are intended to refer only to the particular structure of the present invention that are selected to be shown in the drawings and are not intended to define or limit the scope of the invention. Rather, the present invention is illustrated as applied to a commode and a seat, and it will be appreciated that this application is shown for purposes of brevity only, while the principles demonstrated will be equally applicable whenever it is desired to threadedly joined two non-resilient members, as applied with a fastener assembly such as a bolt and a nut. The present invention finds particular utility with any fastening assembly, and shall not be limited to the particular application described hereinbelow.

Figure 3:
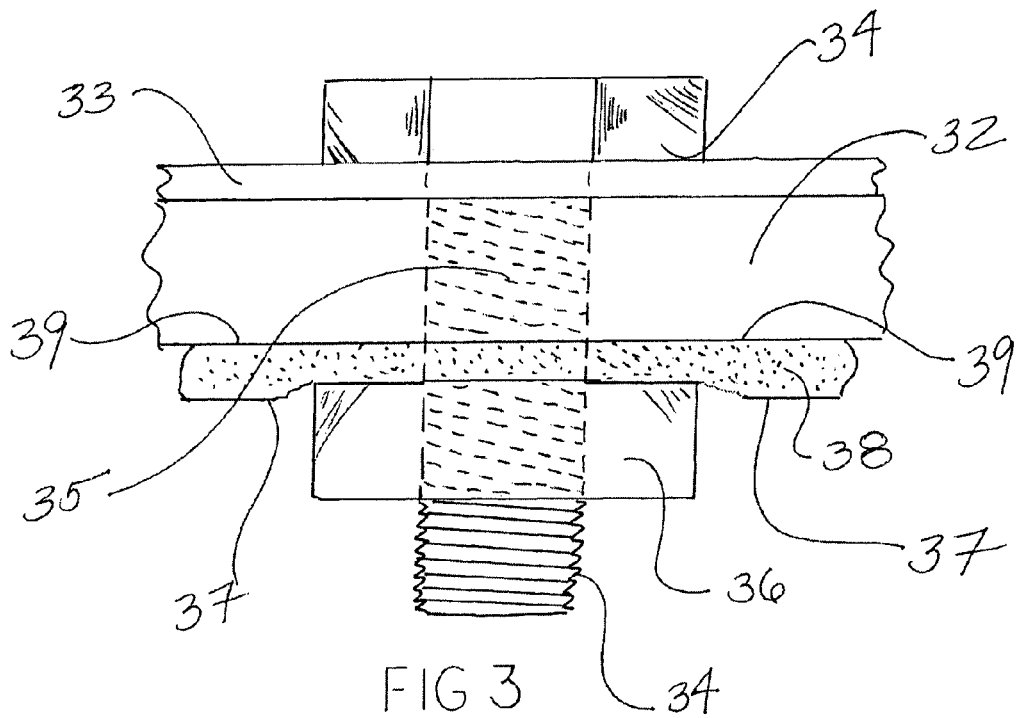
FIG. 3 is a side-elevational view of the present invention installed in situ in a cutaway version of the outer wing of the commode bowl basin.

Referring first to FIG. 1, the commode and toilet seat combination and fastener assembly is generally denoted by the numeral 10, which further includes a commode bowl basin 12 having a bowl basin outer wing 13 with an aperture 15 extending therethrough. Toilet tank 14 is attached to the back of commode 12, and is adapted to receive a toilet seat hinge plate 17 having a bolt cover cap 16 hingedly attached thereto by a living hinge. Fastening assembly bolt 18 extends through toilet seat hinge 17 and then aperture 15 of commode 12. Adhesive washer 20, in accordance with the present invention, is threaded over the threaded portion of bolt 18 and threaded flanged nut 22 is secured over bolt 18 and tightened by hand into position under the outer wing 13 of commode 12. Commode bowl aperture 15 serves to concentrically position the fastener assembly bolt 18 within the aperture 15 and the toilet seat hinge 17. The cooperating threadedly flanged nut 22 is axially rotated up until the upper flange portion of flanged nut 22 contacts the adhesive surface of adhesive washer 20, urging washer 20 against the underside of the outer wing 13 of commode bowl 12, described furthermore hereinbelow. As best seen in FIG. 3, the adhesive washer is compressed slightly by the flange of the nut after insulation such that the flange is slightly embedded into the washer and secured in place by the adhesive. If adhesive is used on both sides of the washer, the fastener assembly comprised of the bolt 18 and the threadedly flanged nut 22 are secured in semi-permanent engagement with the underside of commode 12.

Figure 2:
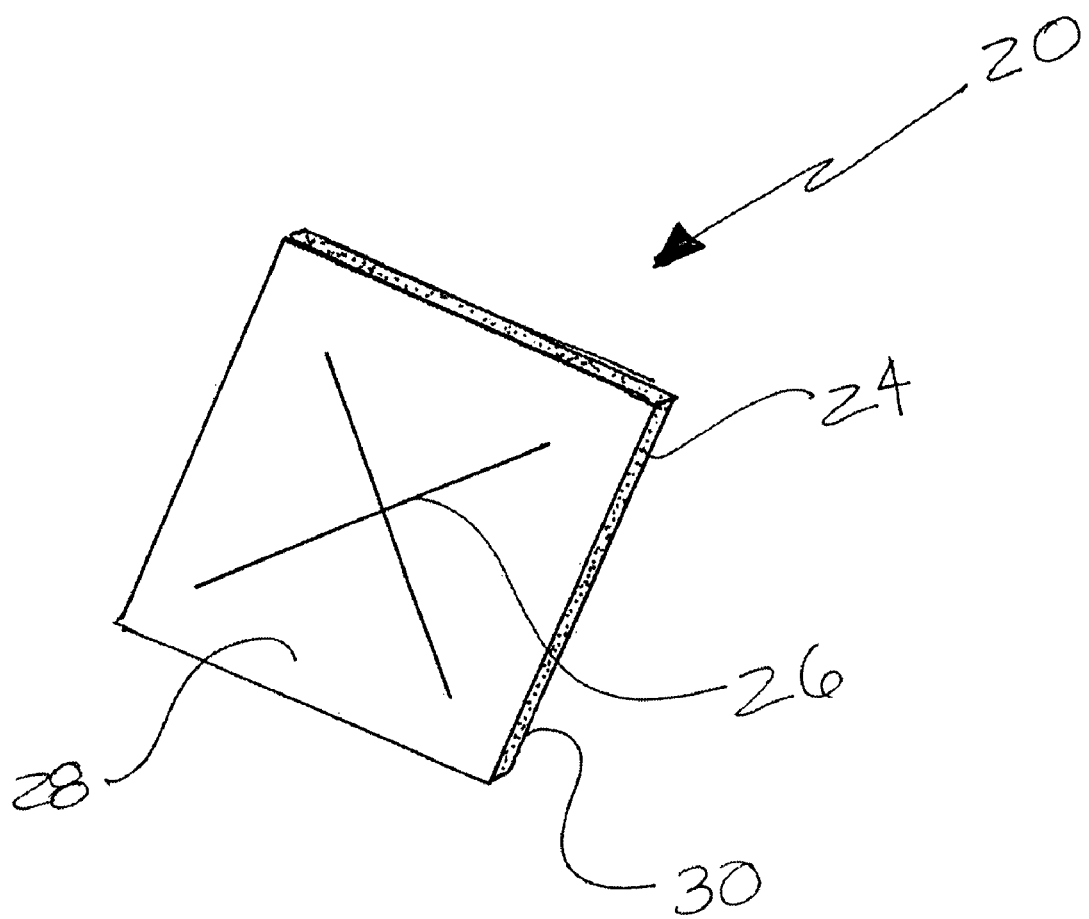
FIG. 2 is a frontal perspective view of a single adhesive washer of the present invention.

Referring now to FIG. 2 there is shown an adhesively surfaced washer generally denoted by numeral 20 made of a semi-compressible or compressible material 24 and having at least one surface having an adhesive 28 for sealing against the nut flange. The adhesively surfaced washer may be made of a sheeted compressible material with a release paper covering the at least one adhesively surfaced side of the washer. An optional second adhesive 30 may appear on the opposing side of the washer. In the event of a double sided adhesively surfaced washer, both sides may include a non-tacky release paper over the adhesive portion. In one aspect of the invention, such a release paper may include a waxy type of paper or one that has a silicone or other non-tacky surface that easily can be peeled from the adhesively covered portions of the washer.

An aperture 26 in the washer may be of any suitable configuration, including a die cut slit, as shown in FIG. 2, or as any other type of aperture, including a perforation, a hole, a knock-out cutout, or any other suitable aperture so that the fastener assembly bolt can be received therethrough. The compressible material may be made of any sort of thermoset or thermoplastic resin, a foamed agent, a medium or dense foam piece, a rubber-like substance, rubber itself, or any other type of standard compressible material that may be used for the washer. These adhesives may be selected from the group consisting of hot-melts, acrylic-types, tackifying resins, acrylic acid esters of monohydric alcohols, alpha-olefins, monoethylenically unsaturated copolymerizable monomers, a blend of poly(propylene-co-higher 1-olefin), tackifying resin and crystalline propylene containing polymer, mixed block polymer adhesive, block copolymers, pressure-sensitive tape having a plurality of adhesive layers, elastomeric adhesives that include natural rubbers, polychloroprenes (neoprene), acrylonitride butadiene (nitrile), butyl rubber adhesives, styrene butadiene rubber, thermoplastic adhesives that include polyvinyl acetate (PVA), polyvinyl alcohol (PVA), polyacrylates, polyester acrylics, acrylic solvent cement, cyanoacrylates (superglue), silicone resins, polyamides and acrylic acid diesters. adhesives, polyurethane adhesives, polysulphide rubber adhesives, silicone rubber adhesives, or any combination thereof. These hot-melt adhesive compositions have a novel combination of properties including strong T-peel and lap shear bonds to both low- and high-density polyethylene with excellent creep resistance at ambient temperatures.

The pressure-sensitive adhesive may be optimally applied before the product is sold, but may be sold as a separate liquid that can be applied to the washer at the time of installation. Such a pressure-sensitive adhesive may include anything that is conventional in the art but should have a shear strength of from about 1 MPa (N/mm2) to about 75 MPa (N/mm2), but preferably from about 2 MPa (N/mm2) to about 10 MPa (N/mm2). The peel strength of the adhesive may be as important to the application as the shear strength. The peel strength of the adhesive is preferably from about 1 N/mm to about 14 N/mm.

An adhesive is a substance that fastens or bonds materials using surface attachment. The strength of an adhesive joint depends on the strength of the attachment of the adhesive to the material surface (substrate) termed adhesion and strength of the adhesive termed cohesion. Adhesives can also provide a sealing function.

In another aspect of the present invention a spray-on, drip-on, brush-on or roll-on adhesive may be applied to the washer immediately prior to installation by the installer. The adhesive in this aspect of the invention would be waterproof, as a water-based solvent would yield a washer that would lose its adhesiveness once the commode bowl sweated to the point where water droplets would erode or dissolve the adhesive itself.

In another aspect of the invention, a method of installing the washer is disclosed. For all applications, we will disclose a particular application wherein a toilet seat is placed atop a commode, and the apertures in the toilet seat hinge and the commode are lined up to receive a fastener assembly. The fastener, usually a bolt, is inserted downwardly through the two apertures and allowed to hang below the commode, ready to receive a washer. The adhesive washer of the present invention has contacted a liquid, preferably water, that temporarily detackifies the adhesive on the washer, allowing the installer to position the washer into place over the bolt and tighten the nut on the other end without wadding up the adhesive on the washer or sticking to the fingers of the installer. Once the nut is sufficiently tightened, the liquid will squeeze out from between the washer and the flange, and the fastener assembly will be semi-permanently affixed into position by the adhesive. This method allows for easy installation.

FIG. 3 shows a side elevational view of an adhesive washer of the present invention in situ with the fastening assembly extending through the toilet seat hinge flange and the commode rim. A commode rim 32 is shown having an aperture 35 extending downwardly therethrough. A toilet seat hinge flange 33 is located atop the commode rim 32 and also has aperture 35 extending therethrough. In the fastener assembly, the bolt 34 is shown inserted through aperture 35 and extending downwardly through the seat threadedly flanged nut 36, which is compressing the adhesive compressible washer 38.

As can be seen in FIG. 3, the seat nut 36 compresses the compressible material of washer 38 such that a pressure-sensitive adhesive 37 adheres to the top flanged surface of nut 36. In another aspect of the present invention, a second adhesive surface on the top of washer 38, adhesive surface 39 is pressurized against the lower surface of commode rim 32. Adhesive 39 will adhere the washer 38 to the bottom of commode rim 32, and will also adhere the lower surface adhesive 37 against seat nut 36. Consequently, it is an aspect of the present invention that the seat nut 36 will remain axially stabilized against any turning or rotation due to the adhesive on the washer 38.

Figure 4:
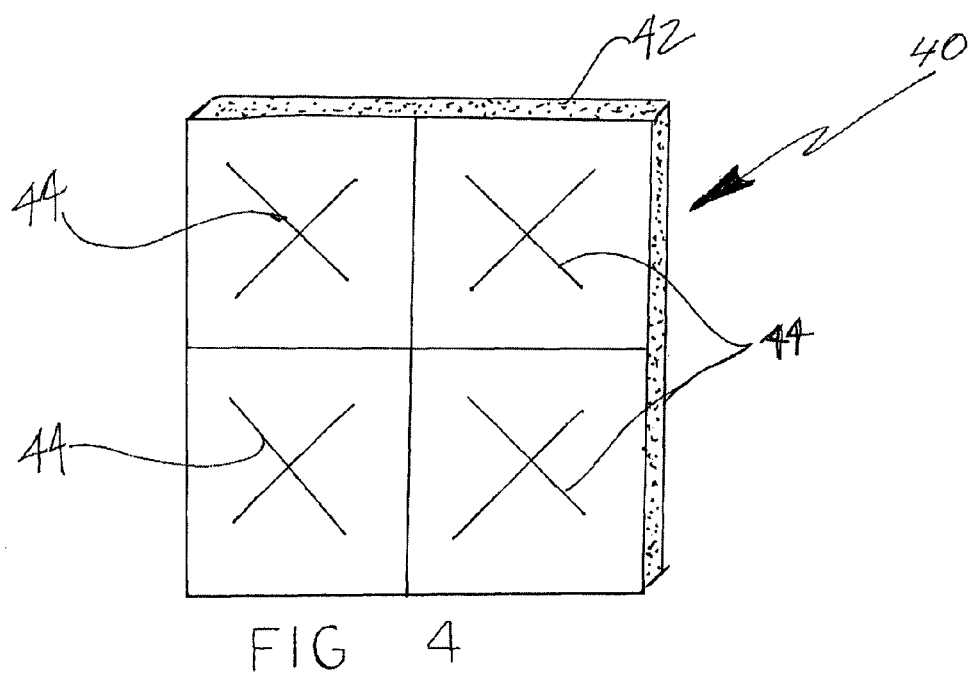
FIG. 4 shows a die cut sheet-like washer material configuration including the apertures of FIG. 2.

FIG. 4 shows a sheet-like material described generally by numeral 40, including a compressible washer material 42 having apertures 44 slit or cut therethrough. Again, the washer material 42 is preferably compressible, but is not necessarily so. Apertures 44 may be of any configuration, including the slit configuration shown in FIG. 4 but may also be perforations or apertures for receiving the bolt therethrough which is common in holding on the toilet seat to the commode rim. Of course, washers 40 may be of a circular design, oval design, or any other design that is conventional and easy to manufacture. As long as the washer is larger than the flange face of a conventional toilet seat nut flange, the adhesive of the present invention should work. In the present aspect, the washer is larger than the nut flange radially extending outward from the bolt in the fastener assembly.

An elongated flattened extended surface for washer 40 is designed to yieldably and adhesively engage the parts together to prevent slippage of the nut. As the nut generally has a hand-graspable portion it can be tightened against the bolt of the fastener assembly in order to compress against the adhesive surface 37 of washer 38. This compression activates the pressure-sensitive adhesive to yield axial captivation of the nut by capturing the nut flange surface on the upper extension of nut 36.

In summary, numerous benefits have been described which result from employing any or all of the concepts and the features of the various specific embodiments of the present invention, or those that are within the scope of the invention. The foregoing description of a preferred embodiment of the invention has been presented for purposes of illustration and description. It is not intended to be exhaustive or to limit the invention to the precise form disclosed. Obvious modifications or variations are possible in light of the above teachings with regards to the specific embodiments. The embodiment was chosen and described in order to best illustrate the principles of the invention and its practical applications to thereby enable one of ordinary skill in the art to best utilize the invention in various embodiments and with various modifications as are suited to the particular use contemplated.

What is claimed is:

1. A washer for toilet seat securement, comprising:
    an adhesive toilet seat washer to be placed between the toilet seat and the toilet to prevent the toilet seat fastener assembly from becoming loose, including an aperture for receiving the fastener assembly therethrough, wherein the washer is made of a material made of any sort of thermoset or thermoplastic resin, a foamed agent, a medium or dense foam piece rubber, and combinations thereof;
    at least one surface of the washer having an adhesive applied thereto, said adhesive being temporarily detackifiable prior to installation when contacted with water, but upon tightening, said adhesive becomes semi-permanently adhered,
        wherein said adhesive on at least one surface of the washer has an adhesive applied thereto that exhibits a shear strength of from about 1 MPa (N/mm2) to about 75 MPa (N/mm2) and said adhesive is selected from the group consisting of hot-melts, acrylic-types, tackifying resins, acrylic acid esters of monohydric alcohols, alpha-olefins, monoethylenically unsaturated copolymerizable monomers, a blend of poly (propylene-co-higher 1-olefin), tackifying resin and crystalline propylene containing polymer, mixed block polymer adhesive, block copolymers, pressure-sensitive tape having a plurality of adhesive layers, elastomeric adhesives that include natural rubbers, polychloroprenes (neoprene), acrylonitride butadiene (nitrile), butyl rubber adhesives, styrene butadiene rubber, thermoplastic adhesives that include polyvinyl acetate (PVA), polyvinyl alcohol (PVA), polyacrylates, polyester acrylics, acrylic solvent cement, cyanoacrylates (superglue), silicone resins, polyamides and acrylic acid diesters, adhesives, polyurethane adhesives, polysulphide rubber adhesives, silicone rubber adhesives, or any combination thereof.

2. The washer of claim 1, wherein the washer is made of a compressible sheeted material having adhesive on both surfaces and release paper on both sides to prevent tackiness during handling.

3. The washer of claim 1, wherein the washer has at least one surface of the washer having an adhesive applied thereto that exhibits a shear strength of from about 2 MPa (N/mm2) to about 10 MPa (N/mm2).

* * * * *